US011825327B2

(12) United States Patent
Agarwal et al.

(10) Patent No.: US 11,825,327 B2
(45) Date of Patent: Nov. 21, 2023

(54) ENABLING MULTI-NETWORK PATH AWARE APPLICATIONS (71) Applicant: NOKIA SOLUTIONS AND NETWORKS OY, Espoo (FI)

(72) Inventors: Salil Agarwal, Bangalore (IN); Satish K, Bengaluru (IN); Krishna Pramod A, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 263 days.

(21) Appl. No.: 16/756,974

(22) PCT Filed: Oct. 17, 2017

(86) PCT No.: PCT/EP2017/076445
§ 371 (c)(1),
(2) Date: Apr. 17, 2020

(87) PCT Pub. No.: WO2019/076440
PCT Pub. Date: Apr. 25, 2019

(65) Prior Publication Data
US 2021/0127289 A1  Apr. 29, 2021

(51) Int. Cl.
*H04W 8/00* (2009.01)
*H04W 28/02* (2009.01)
*H04W 8/18* (2009.01)
*H04W 16/14* (2009.01)
*H04W 60/00* (2009.01)
*H04W 74/08* (2009.01)

(52) U.S. Cl.
CPC ....... *H04W 28/0205* (2013.01); *H04W 8/186* (2013.01); *H04W 16/14* (2013.01); *H04W 60/00* (2013.01); *H04W 74/0808* (2013.01)

(58) Field of Classification Search
CPC . H04W 28/0205; H04W 16/14; H04W 60/00; H04W 74/0808; H04W 8/186
See application file for complete search history.

(56) References Cited

U.S. PATENT DOCUMENTS

| 2014/0092828 | A1* | 4/2014 | Sirotkin | H04W 28/0252 370/329 |
| 2015/0201046 | A1* | 7/2015 | Biswas | H04L 69/321 370/329 |
| 2018/0242383 | A1* | 8/2018 | Horn | H04L 45/24 |

FOREIGN PATENT DOCUMENTS

WO   WO 2016/034245 A1   3/2016

OTHER PUBLICATIONS

International Search Report and Written Opinion dated Jun. 14, 2018 corresponding to International Patent Application No. PCT/EP2017/076445.

(Continued)

*Primary Examiner* — Lakeram Jangbahadur
(74) *Attorney, Agent, or Firm* — SQUIRE PATTON BOGGS (US) LLP (57) ABSTRACT

An apparatus is provided which comprises at least one processor, at least one memory including computer program code, and the at least one processor, with the at least one memory and the computer program code, being arranged to cause the apparatus to at least perform providing information concerning multiple networks to at least one application, receiving instructions from the application, and managing traffic relating to the at least one application on the multiple networks based on the instructions received from the application.

14 Claims, 5 Drawing Sheets

(56) References Cited

OTHER PUBLICATIONS

"Multiple Access Management Services" (MAMS) by S. Kanugovi et al. (INTAREA IETF draft-kanugovi-intarea-mams-protocol-05), Sep. 27, 2017.
European Office Action issued in corresponding European Patent Application No. 17 787 156.3-1213 dated Dec. 1, 2021.

\* cited by examiner

ENABLING MULTI-NETWORK PATH AWARE APPLICATIONS

FIELD OF THE INVENTION

The present invention relates to an apparatus, a method and a computer program product by which it is possible to enable multi-network path aware applications.

RELATED BACKGROUND ART

The following meanings for the abbreviations used in this specification apply:
- 3GPP 3rd Generation Partnership Project
- API Application Programming interface.
- C-MADP Client Multi-Access Data Proxy
- CCM Client Connection Manager
- DSL Digital Subscriber Line
- HTTPS Secure Hypertext Transfer Protocol
- IETF Internet Engineering Task Force
- LTE Long Term Evolution (4G)
- MAMS Multiple Access Management Services
- MEC Multi-access Edge Computing
- N-MADP Network Multi-Access Data Proxy
- NCM Network Connection Manager
- UE user equipment
- URLLC ultra-reliable and low latency communications Embodiments of the present invention, although not limited to this, relate to multi-network path and multi-access technologies, wherein it is possible for a device to be connected to multiple access technologies (like LTE, Wi-Fi 5G and more) at the same time and utilize multiple paths for data transfer to the application (which itself is not generally multi-access aware) using a Multi-Path Network Manager. In such scenarios, the multi-path network manager provides both the control and user plane functionality of managing and aggregating the various flows and controlling the distribution of traffic across technologies based on parameters such as conditions of each access technology, device capabilities etc.

For example, document "Multiple Access Management Services" (MAMS) by S. Kanugovi et al (INTAREA IETF draft-kanugovi-intarea-mams-protocol-05), Sep. 27, 2017, describes such multi-network path and multi-access technologies.

SUMMARY OF THE INVENTION

Embodiments of the present invention aim to improve flexibility and performance of applications in such multi-network path and multi-access technologies.

According to a first aspect of the present invention, an apparatus is provided which comprises at least one processor, at least one memory including computer program code, and the at least one processor, with the at least one memory and the computer program code, being arranged to cause the apparatus to at least perform providing information concerning multiple networks to at least one application, receiving instructions from the application, and managing traffic relating to the at least one application on the multiple networks based on the instructions received from the application.

According to a second aspect of the present invention, a method is provided which comprises:
providing information concerning multiple networks to at least one application,
receiving instructions from the application, and
managing traffic relating to the at least one application on the multiple networks based on the instructions received from the application.

The first aspect and the second aspect may be modified as follows:

For example, the information concerning multiple networks may be subscriber based.

Moreover, upon managing traffic related to the at least one application, the traffic relating to the at least one application may be distributed on the multiple networks based on the instructions received from the application.

The traffic relating to the at least one application may be distributed on the multiple access networks separately for uplink and downlink directions.

The at least one application may be informed how the traffic is distributed on the multiple networks.

Information may be acquired from a network provider management function element, and the application may be provided with the information from the network provider management function element and/or managing the traffic relating to the at least one application based on the information from the network provider management function element.

A dedicated interface (e.g., a RESTful interface) may be provided between the apparatus and the at least one application for exchanging information with the at least one application.

The at least one application may be run by an application server, and exchanging information with the at least one application may be performed by exchanging information with the application server.

The information concerning multiple networks may comprise conditions including availability of networks, network load and/or costs.

According to a third aspect of the present invention, an apparatus is provided which comprises at least one processor, at least one memory including computer program code, and the at least one processor, with the at least one memory and the computer program code, being arranged to cause the apparatus to at least perform running an application, receiving information concerning multiple networks from a network control element, creating instructions for managing the multiple network relating to the application based on the received information, and sending the instructions to the network control element.

According to a fourth aspect of the present invention, a method is provided which comprises:
running an application,
receiving information concerning multiple networks from a network control element,
creating instructions for managing the multiple network relating to the application based on the received information, and
sending the instructions to the network control element.

The third aspect and the fourth aspect may be modified as follows:

For example, the apparatus or the apparatus carrying out the method may register with the network element for obtaining the information concerning multiple networks, and/or subscribe to related messages with the network control element.

The information concerning multiple networks may be subscriber based.

Information may be received from the network control element how the traffic is distributed on the multiple networks.

Information may be exchanged between the apparatus or the apparatus carrying out the method with the network control element via a dedicated interface.

According to a fifth aspect of the present invention a computer program product is provided which comprises code means for performing a method according to the second aspect and/or fourth aspect and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to a sixth aspect of the present invention an apparatus is provided which comprises
  means for providing information concerning multiple networks to at least one application,
  means for receiving instructions from the application, and
  means for managing traffic relating to the at least one application on the multiple networks based on the instructions received from the application.

According to a seventh aspect of the present invention an apparatus is provided which comprises
  means for running an application,
  means for receiving information concerning multiple networks from a network control element,
  means for creating instructions for managing the multiple network relating to the application based on the received information, and
  means for sending the instructions to the network control element.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Before describing embodiments, however, the problem underlying the present application is described in some more detail.

That is, in multi-network path and multi-access technologies according to the prior art, applications have no means to differentially charge such distribution of traffic across various access technologies based on type of subscription or application host needs.

In more detail, in most cases application servers are not aware of multiple networks being used by end device with the help of technologies like MPTCP-proxies or using methods as defined in "Multiple Access Management Services" (MAMS) by S. Kanugovi et al (INTAREA IETF draft-kanugovi-intarea-mams-protocol-05), Sep. 27, 2017. The distribution and usage of multi-access is decided between the end device and the multi-path network manager. This system provides for control plane interaction between the device (using an entity called Client Control Manager— CCM) and the multi-network path manger (using an entity called Network Control Manager—NCM). It also provides for data plane entities in the device and the multi network path manager called Client Multi-Access Data Proxy (C-MADP) and Network Multi-Access Data Proxy (N-MADP) respectively.

The current state of the art considers the aspects related to network and client discovering about presence of multiple interfaces and networks and making use of these based on network and client parameters. These prior art do not involve application servers making any decision about usage of multiple networks based on subscriber's parameters. The usage of multiple networks is done based on the device's capability and measurements from the various access technologies.

Embodiments of the present invention aim to improve flexibility and performance of applications in such multi-network path and multi-access technologies by providing measures which enable applications to be aware of multiple networks.

In the following, a general overview of an embodiment of the present invention is described by referring to FIGS. 1A, 1B, 2A and 2B.

Figure 1A:
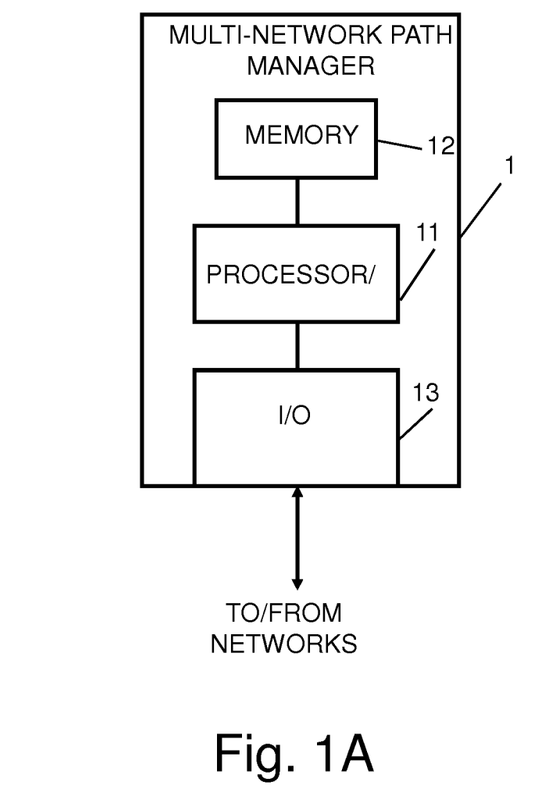
FIG. 1A illustrates a multi-network path manager according to an embodiment of the present invention.

In particular, FIG. 1A shows a multi-network path manager 1 as an example for a first apparatus or a network control element according to the present embodiment. The multi-network path manager 1 comprises at least one processor 11 and at least one memory 12 including computer program code. The at least one processor 11, with the at least one memory 12 and the computer program code, is arranged to cause the apparatus to at least perform providing information concerning multiple networks to at least one application, receiving instructions from the application, and managing traffic relating to the at least one application on the multiple networks based on the instructions received from the application.

Figure 1B:
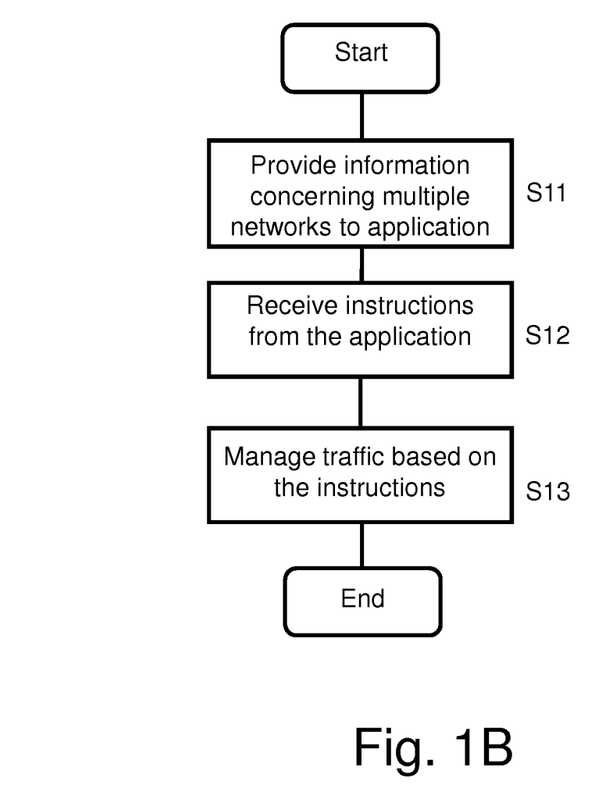
FIG. 1B illustrates a method of a multi-network path manager according to an embodiment of the present invention.
Figure 2A:
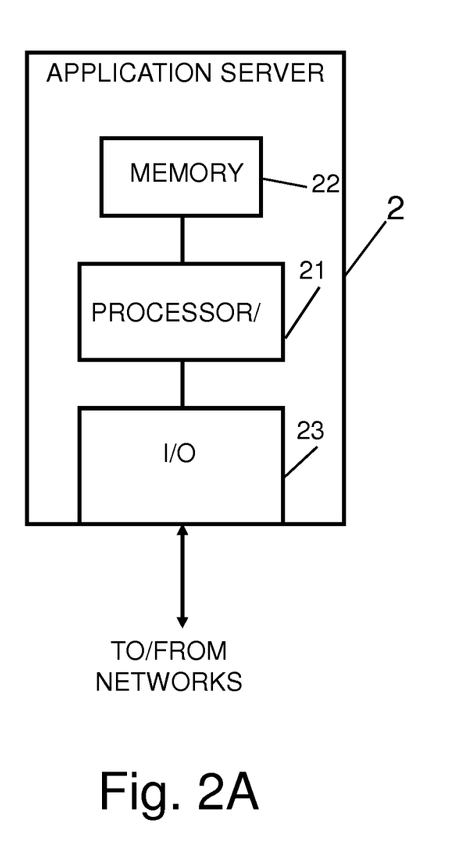
FIG. 2A illustrates an application server according to an embodiment of the present invention.

In other words, by referring to the flowchart shown in FIG. 1B, in step S11 information concerning multiple networks is provided to at least one application (which is run in an application server shown in FIG. 2A, for example). In step S12, instructions from the application are received, which, for example, may indicate how traffic relating to the at least one application should be distributed on the multiple networks, and in step S13, the traffic is managed based on the instructions received from the at least one application.

FIG. 2A shows an application server 2 as an example for a second apparatus according to the present embodiment. The application server 2 comprises at least one processor 21 and at least one memory 22 including computer program code. The at least one processor 21, with the at least one memory 22 and the computer program code, is arranged to cause the apparatus to at least perform running an application, receiving information concerning multiple networks from a network control element, creating instructions for managing the multiple network relating to the application based on the received information, and sending the instructions to the network control element.

Figure 2B:
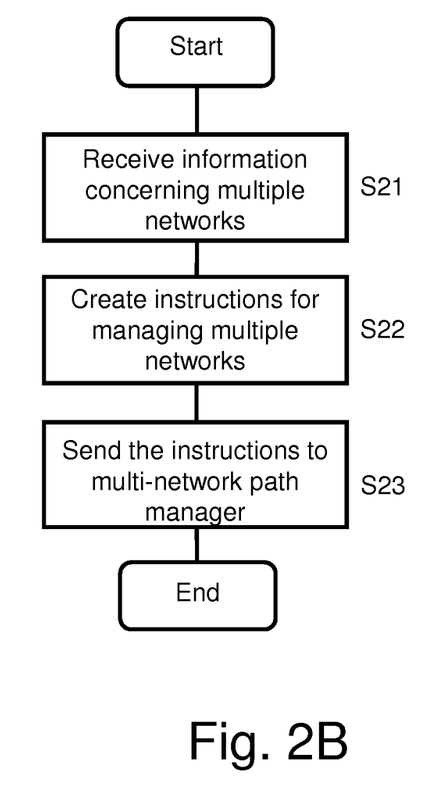
FIG. 2B illustrates a method of an application server according to an embodiment of the present invention.

That is, by referring to the flowchart shown in FIG. 2B, the application server 2, which runs at least one application, receives in step S21 information concerning multiple networks from the network control element, which may be the multi-network path manager 1 shown in FIG. 1A, for example. In step S22, instructions for managing the multiple networks are created based on the received information concerning the multiple networks. In step S23, the instructions are sent to the network control element.

Thus, according to embodiments of the present invention, the at least one application is aware of the multiple networks, and can correspondingly instruct the network control element how the traffic should be managed.

The information may be subscriber-based, that is, the information concerning the multiple networks may be different for each subscriber, depending on usage limits, policies etc. set for each subscriber.

Managing of the traffic related to the at least one application may comprise distributing the traffic on the multiple networks. For example, a certain percentage of the traffic may be transmitted via a first network, and the remaining percentage of the traffic may be transmitted via a second network.

The multi-network path manager 1 may further comprise input/output (I/O) units or functions (interfaces) 13 connected to the processor 11, in order to provide connections to other elements such as a user device and to the application server 2, for example. In particular, the I/O units or functions 13 may comprise different receiver/transmitter units necessary for the multiple networks.

Moreover, the application server 2 may further comprise input/output (I/O) units or functions (interfaces) 23 connected to the processor 21, in order to provide connections to other elements in a network, in particular to the multi-network path manager 1.

In the following, some more details of embodiments of the present invention are described.

Figure 3:
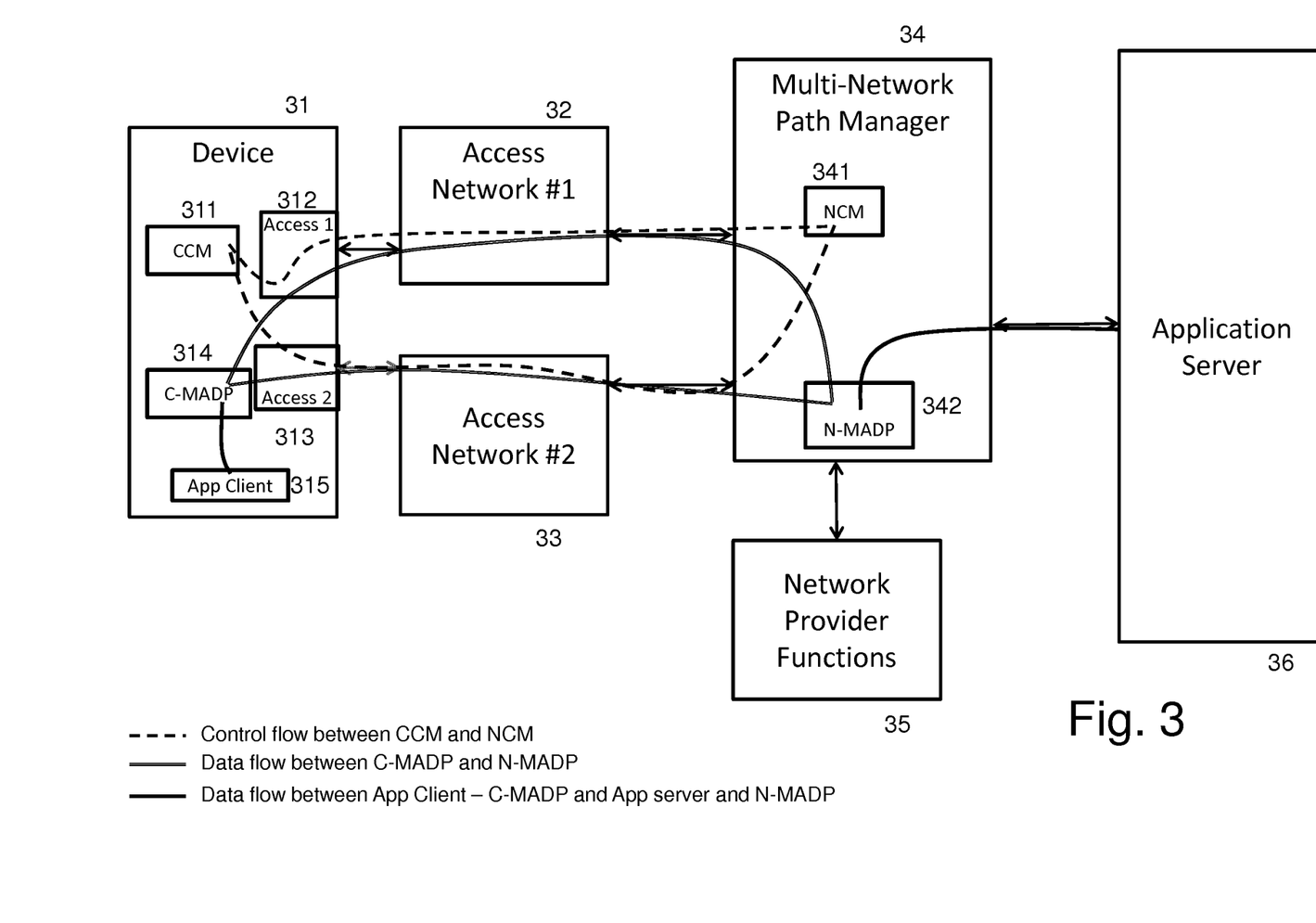
FIG. 3 illustrates an architectural view in which embodiments of the present invention can be applied.

FIG. 3 illustrates a high level architectural view of multiple-networks path based access, to which embodiments of the present invention can be applied.

In particular, a device 31 is connected to a multi-network path manager 34 (which may be the multi-network path manager 1 shown in FIG. 1A) via two different access network, namely a first access network 32 and a second access network 33. The multi-network path manager is connected to network provider functions 35 and with an application server 36 (which may be the application server 2 shown in FIG. 2A).

The device 31, which is a client, and in this particular case a multiconnectivity client, comprises a client connection manager (CCM) 311, a first access means 312 for the first access network 32, a second access means 313 for the second access network 33, a client multi access data proxy (C-MADP) 314 and an application client (app client) 315 as functional entities.

The multi-network path manager 34 comprises a network connection manager (NCM) 341 and a network multi access data proxy (N-MADP) 342 as functional entities.

The CCM 311 is a functional entity in the client that exchanges MAMS Signaling with the network connection manager (NCM) 341 in the multi-network path manager 34 and configures the multiple network paths for transport of user data.

The C-MADP 314 is a functional entity in the client that handles the user data traffic forwarding across multiple network paths. C-MADP is responsible for MAMS related user-plane functionalities in the client.

The NCM 341 is a functional entity in the multi-network path manager 34 that oversees distribution of data packets over the multiple available access and core network paths.

The N-MADP 342 is a functional entity in the multi-network path manager 34 handles the user data traffic forwarding across multiple network paths. The N-MADP is responsible for MAMS related user-plane functionalities in the network.

As derivable from FIG. 3, a control flow between CCM 311 and the NCM 341 extends over both access networks 32 and 33 via both access means 312 and 313. Data flows extends between the application client 315 and the C-MAPD 314, and between the application server 36 and the N-MAPD 342. This data flow is transmitted between the C-MADP 314 and the N-MAPD 342 over both access networks 32 and 33 via both access means 312 and 313.

Within such a configuration, embodiments of the present invention provide for following:

According to embodiments of the present application, application(s) connected to Multi-Path Network Manager is (are) enabled to be aware of multi-networks and conditions (like availability, network load, cost etc.) of each network.

In contrast thereto, current prior art methods do not provide this information to application even though the information is available with the network elements themselves.

According to embodiments of the present application, such an application is allowed to instruct the multi-network path manager to distribute the traffic to various network access technologies separately for uplink and downlink direction based on parameters known to application (e.g. subscribers profile, subscription type, location etc.). It is noted that the NCM 341 (the NCM component) of the multi-network path manager 34 communicates the decision to the CCM 311 (the CCM component) in the device 31 using MAMS.

In contrast thereto, current prior art performing traffic steering/distribution do not consider preference from the application being served. They perform the action based on information available from network only e.g. measurements from device, interface availability.

According to embodiments of the present application, in case of application driven distribution of traffic across multi-network paths the multi-network path manager provides report of such distribution to the application for it to enable differential (premium) rate of charging for such subscribers.

In contrast thereto, current prior art applications are not given any report of actual usage of traffic across multiple networks for any kind of differential charging by the application itself.

Figure 4:
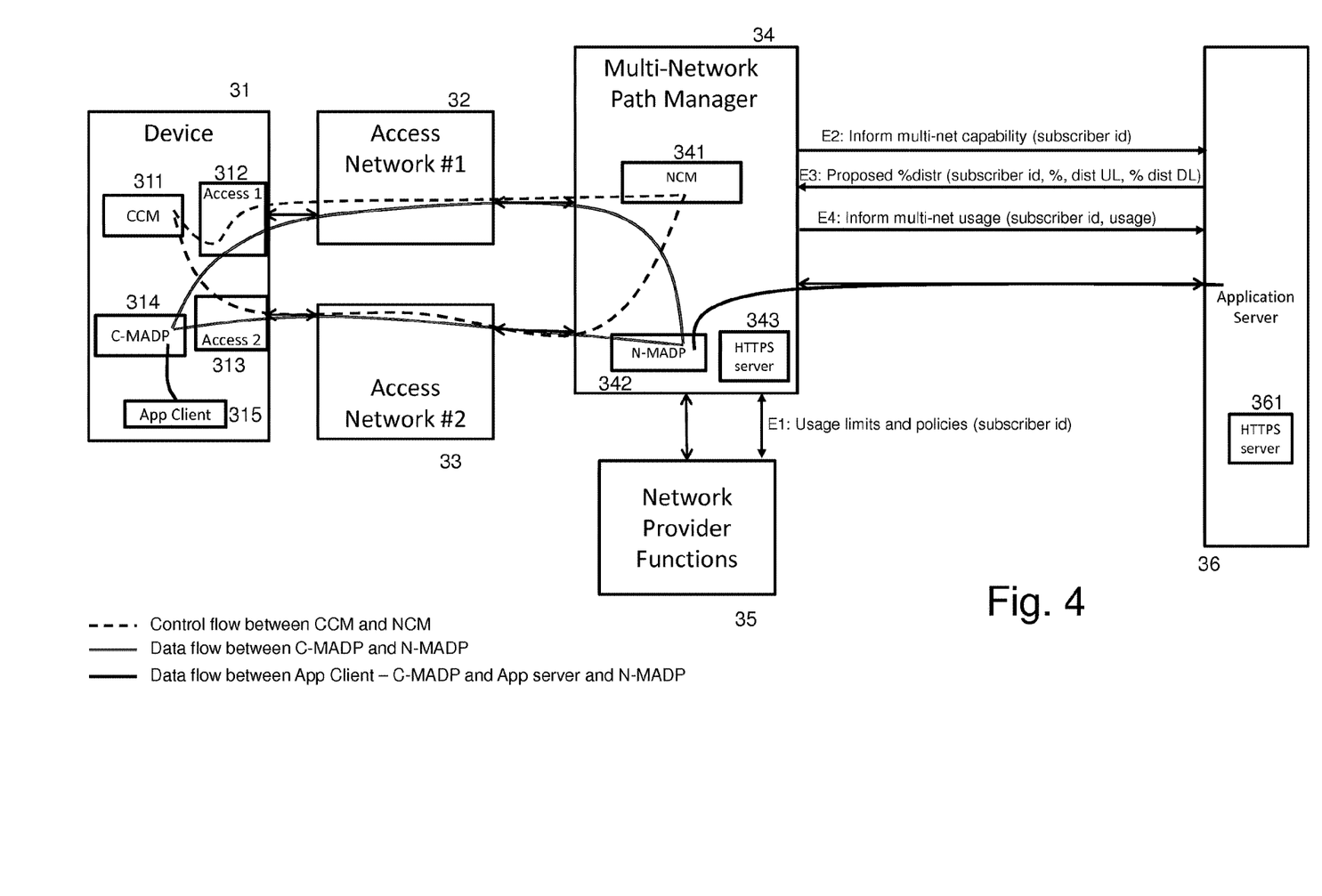
FIG. 4 shows basic procedures according to an embodiment of the present invention.

The above functionalities according to embodiments of the present application are illustrated in FIG. 4.

In E1, the multi-network path manager 34 acquires usage limits and policies for a subscriber, which is identified by a subscriber id. This is effected via a HTTPS server 343 in the multi-network path manager 34.

In E2, the multi-network path manager 34 informs multi-network capability for the subscriber.

In E3, the application (application server 36) sends a proposed distribution for the subscriber to the multi-network path manager 34, for example by including a percentage of the distribution in UL and a percentage of distribution in DL. Communication between the application server 36 can be performed via a HTTPS server 361 in the multi-network path manager 34 and the HTTPS server 343 in the multi-network path manager 34

In E4, the multi-network path manager 34 informs the multi-network usage of the subscriber.

A more detailed implementation is described in the following.

In this example, the multi-network path manager 34 implements a RESTful interface to exchange information with the hosted applications. These events can be
a) device capability about multi-networks,
b) addition of new network,
c) mobility related events,
d) measurement of various networks accessed by device
e) removal of network etc.

Moreover, the multi-network path manager 34 implements an interface with the Network Provider Management functions to exchange information on update of usage for charging, set overall usage limits, etc.

Additionally, there can be publication of following kind of information which is not device specific:
a) Utilization of each network access
b) Load/Overload conditions (say at cells or access points)
c) Availability of a network path
d) Cost set by operator for each access technology (premium access and non-premium access)

A multi-network aware application can subscribe to related messages with the multi-network path manager 34. In this example implementation scenario both the multi-network path manager and the application server 36 host a HTTP(S) server, as indicated by reference numerals 343 and 361.

Figure 5:
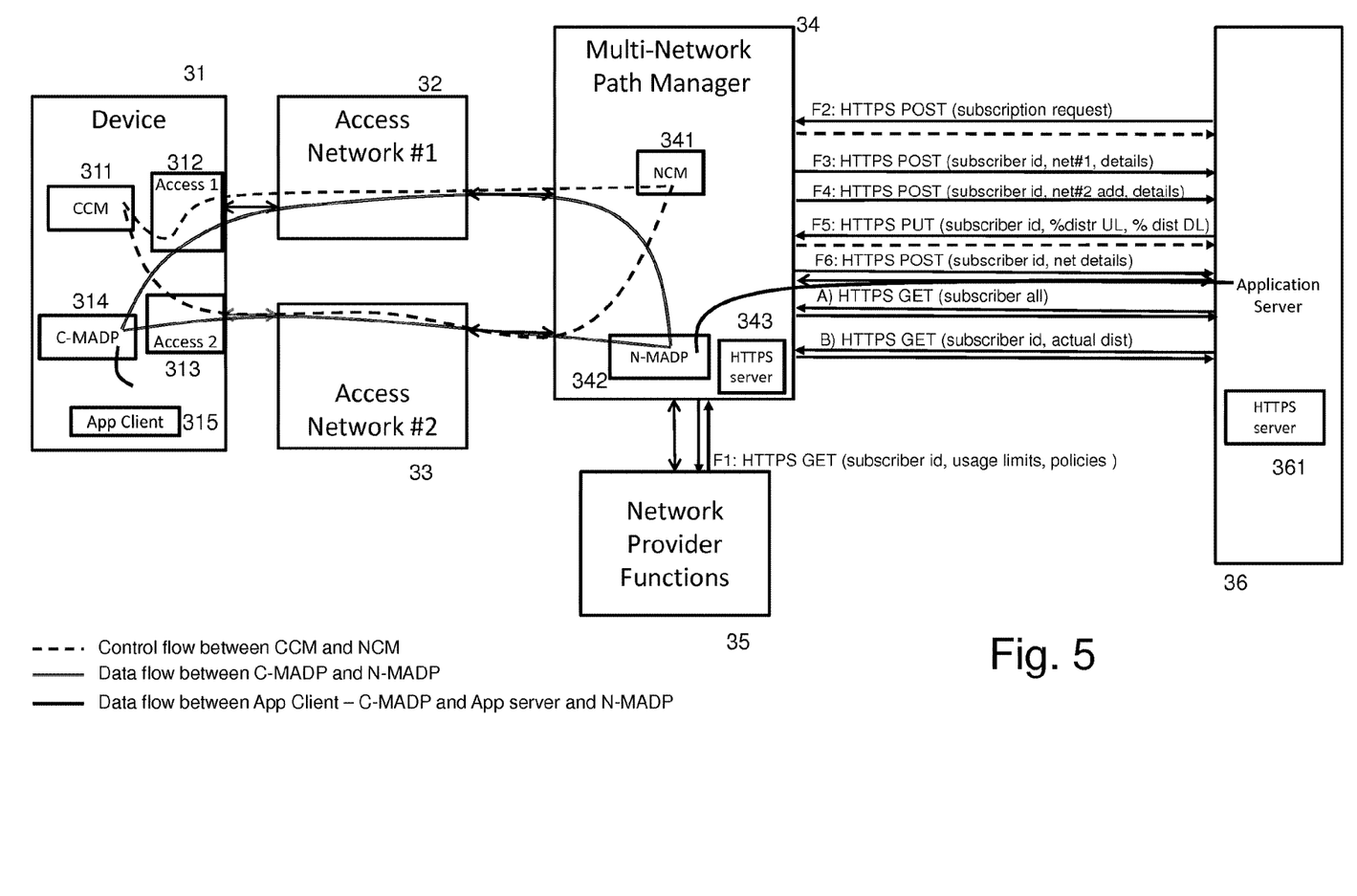
FIG. 5 shows an implementation example according to an embodiment of the present invention.

FIG. 5 represents a flow for a sample application according to an embodiment of the present invention.

In F1, the multi network path manager 34 gets information on overall access usage limits and policies from the network provider function 35 (e.g. Charging).

In F2, the application registers itself and subscribes to messages of its interest (such as admission of new subscriber in multi-network path, addition of a new network path, deletion of a network path etc.) with the multi-network path manager 34 using HTTPS POST request.

As indicated by the dashed arrow in F2, the multi-network path manager 34 registers the application's request and responds with OK.

In F3, on admitting a new subscriber with multi-network path capability, the multi-network path manager 34 informs the registered application (using HTTPS POST) with subscriber Id and details of the subscriber and the type of a first network (e.g., access network #1).

In F4, on addition of a new network path (e.g., via access network #2) the multi-network path manager 34 informs the application (using HTTPS POST) about this along with details of the new addition.

In F5, the application determines, based on its internal logic, subscriber's profile, subscription type, available capacity, etc. a proportionate distribution for uplink and downlink direction of traffic flow. The application can send a request of desired proportions to the multi-network path manager 34 using HTTPS POST. The application can choose to vary this at any point of time depending on the actual usage or change subscriber's parameters/profile, quality indicator of each network, load of system etc. Moreover, as indicated by the dashed arrow, the multi-network path manager 34 sends a response to confirm that the instruction is taken care of. Alternatively, the multi-network path manager 34 may also return an error to the application (the application server) 36, in case the multi-network path manager 34 cannot for some reason follow the instructions.

In F6, the multi-network path manager 34 keeps sending network details (quality indication, utilization, cost, delay etc.), by using HTTPS POST, of each the network that the subscriber is connected to at regular interval.

In A, it is indicated that the application at any time can send a HTTPS GET request to the Multi-Network Path Manager to know the details of all subscribers which are being served by the application along with details of the networks they are connected to and their details.

In B, it is indicated that the application can any time send a HTTPS GET request to Multi-Network Path Manager to acknowledge details about a subscriber. One typical usage of this information could be charge the subscriber based on the actual usage of each of the network access types base on a differential cost and subscriber's profile/subscription.

Moreover, the multi-network path manager 34 provides usage information to the network provider function 35.

With this implementation, it is possible for application to instruct distribution of traffic separately in uplink and downlink directions across various access technologies based on parameters like subscriber profile, quality indicator of each network access, cost of accessing each network as set by respective operator/owner of the network etc. The application can get to know about the actual usage across various networks and have an option of charging the subscriber differentially based on access technologies used.

The multi-access part of Multi-Network Path Manager can be implemented as defined in IETF MAMS specifications.

In the following, a real life example is described:

A premium subscriber (capable of using multiple networks) of a messenger service (an application which is aware of multi-network capabilities and already registered with multi-network path manager (corresponding to step F2 in FIG. 5)) joins using WiFi network, this information is communicated by multi-network path manager to the application (corresponding to step F3 in FIG. 5). After a time, subscriber joins LTE network (corresponding to step F4 in FIG. 5). The messenger service determines that this is a premium subscriber and that LTE is having a better quality and asks the multi-network path manager 34 to shift uplink from WiFi to LTE completely and downlink to use LTE 50% of time (corresponding to step F5 in FIG. 5). At the end of transaction the messenger service requests for a report from multi-network path manager (corresponding to step B in FIG. 5), and charge the user as per subscription.

For a non-premium user in similar case the messenger service can decide to continue with WiFi even when this subscriber joins LTE and LTE is providing better service.

Hence, according to embodiments of the present invention, applications can be aware of multiple networks and can make use of the multiple networks. Thus, flexibility for the applications is improved.

The invention is not limited to the specific embodiments described above, and various modifications are possible.

For example, in the above embodiments, it was described that the multiple networks comprise different access networks technologies. However, the invention is not limited to this. That is, the different networks may have the same technology. For example, when a WiFi connection is used, the different network may use different frequency bands for the WiFi connection. Similar may apply to LTE and other network technologies.

Moreover, in the above embodiments, HTTPS is used. However, HTTPS is only an example, and any other secure means of communication can also be used between the entities.

Moreover, in the examples shown in FIGS. 3 to 5 only two access networks are shown. However, the number of the access network is not limited to two and can be any number higher than 1.

For the purpose of the present invention as described herein above, it should be noted that method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus, comprising:
at least one processor; and
at least one memory including computer program code, the at least one processor, with the at least one memory and the computer program code, being configured to cause the apparatus to at least perform
providing information concerning multiple networks to at least one application,
receiving instructions from the application, and
managing traffic relating to the at least one application on the multiple networks based on the instructions received from the application.

2. The apparatus according to claim 1, wherein the information concerning multiple networks are subscriber based.

3. The apparatus according to claim 1, wherein the at least one processor, with the at least one memory and the computer program code, is configured to cause the apparatus to further perform
upon managing traffic related to the at least one application, distributing the traffic relating to the at least one application on the multiple networks based on the instructions received from the application.

4. The apparatus according to claim 3, wherein the at least one processor, with the at least one memory and the computer program code, is configured to cause the apparatus to further perform
distributing the traffic relating to the at least one application on the multiple access networks separately for uplink and downlink directions.

5. The apparatus according to claim 1, wherein the at least one processor, with the at least one memory and the computer program code, is configured to cause the apparatus to further perform
acquiring information from a network provider management function element, and
providing the application with the information from the network provider management function element or managing the traffic relating to the at least one application based on the information from the network provider management function element.

6. The apparatus according to claim 1, wherein
the at least one application is run by an application server, and
the at least one processor, with the at least one memory and the computer program code, is configured to cause the apparatus to further perform
exchanging information with the at least one application by exchanging information with the application server.

7. An apparatus, comprising:
at least one processor; and
at least one memory including computer program code, the at least one processor, with the at least one memory and the computer program code, being configured to cause the apparatus to at least perform running an application,
receiving information concerning multiple networks from a network control element,
creating instructions for managing the multiple networks relating to the application based on the received information,
sending the instructions to the network control element; and perform registering with the network control element for obtaining the information concerning multiple networks, or subscribing to related messages with the network control element.

8. The apparatus according to claim 7, wherein the information concerning multiple networks are subscriber based.

9. A method, comprising:
providing information concerning multiple networks to at least one application;
receiving instructions from the application; and
managing traffic relating to the at least one application on the multiple networks based on the instructions received from the application.

10. The method according to claim 9, wherein the information concerning multiple networks are subscriber based.

11. The method according to claim 9, further comprising:
upon managing traffic related to the at least one application, distributing the traffic relating to the at least one application on the multiple networks based on the instructions received from the application.

12. The method according to claim 11, further comprising:
distributing the traffic relating to the at least one application on the multiple access networks separately for uplink and downlink directions.

13. The method according to claim 11, further comprising:
informing the at least one application how the traffic is distributed on the multiple networks.

14. The method according to claim 9, further comprising:
acquiring information from a network provider management function element; and
providing the application with the information from the network provider management function element or managing the traffic relating to the at least one application based on the information from the network provider management function element.

* * * * *